(12) United States Patent
Sagar et al.

(10) Patent No.: US 7,155,417 B1
(45) Date of Patent: Dec. 26, 2006

(54) SYSTEM AND METHOD FOR DETECTING FRAUD IN PREPAID ACCOUNTS

(75) Inventors: David J. Sagar, Thytherington Macclesfield (GB); Simon P. Edghill, Chester (GB); Paul Armstrong, Gatley (GB); Stephen Gunby, Lowton Warrington (GB)

(73) Assignee: InterVoice Limited Partnership, Reno, NV (US)

( * ) Notice: Subject to any disclaimer, the term of this patent is extended or adjusted under 35 U.S.C. 154(b) by 934 days.

(21) Appl. No.: 09/874,911

(22) Filed: Jun. 5, 2001

(51) Int. Cl.
*G06Q 40/00* (2006.01)
(52) U.S. Cl. ...................................................... 705/68
(58) Field of Classification Search ............ 705/60–70, 705/50–59; 455/410, 433, 407, 432, 435, 455/461, 466
See application file for complete search history.

(56) References Cited

U.S. PATENT DOCUMENTS

| | | | |
|---|---|---|---|
| 5,809,480 A * | 9/1998 | Chasek ......................... | 705/13 |
| 5,815,807 A * | 9/1998 | Osmani et al. .............. | 455/410 |
| 6,064,875 A * | 5/2000 | Morgan ....................... | 455/410 |
| 6,279,038 B1 * | 8/2001 | Hogan et al. ................ | 709/224 |
| 6,424,706 B1 * | 7/2002 | Katz et al. ................... | 379/144.01 |
| 6,873,617 B1 * | 3/2005 | Karras ......................... | 370/389 |
| 2001/0055291 A1 * | 12/2001 | Schweitzer ................. | 370/337 |
| 2002/0046341 A1 * | 4/2002 | Kazaks et al. .............. | 713/182 |

FOREIGN PATENT DOCUMENTS

FR  2716549 A1 *  8/1995
GB  2312963 A  *  11/1997

\* cited by examiner

*Primary Examiner*—James P. Trammell
(74) *Attorney, Agent, or Firm*—Fulbright & Jaworski LLP

(57) ABSTRACT

The invention provides systems and methods providing independent determinations of services provided to be utilized in detection of fraud. According to a preferred embodiment, a call data record server is provided in communication with a prepaid calling system such that account refill/credit information is provided to the call data record server. The call data record server is also preferably in communication with systems providing subscriber services, such as a cellular service network, such that data regarding services utilized are provided to the call data record server. Using the refill/credit data and raw subscriber service data preferred embodiments of the present invention may independently determine prepaid services utilized by subscribers. Fraud may be detected from these independent determinations of the preferred embodiment by comparing a determined account balance to a selected threshold value and/or by comparing the determined account balance to that of the prepaid calling system.

70 Claims, 2 Drawing Sheets

SYSTEM AND METHOD FOR DETECTING FRAUD IN PREPAID ACCOUNTS

BACKGROUND

It is not uncommon today to provide services through the use of various types of prepaid accounts. For example, prepaid accounts are in prevalent use in telephony systems, such as in mobile networks or wireless networks. In such systems, a prepaid calling system may be implemented that controls a subscriber's making of calls such that the subscriber can only make calls up to the value that they have actually paid into a particular account. For example, if the subscriber has prepaid twenty dollars to a particular account, that subscriber may be enabled to make twenty dollars worth of calls using that account.

There are a variety of system configurations which may be utilized in providing prepaid calling. For example, a service node system may be utilized in providing prepaid calling services. A service node is a system that is installed in the network with telephony trunks attached thereto. The network is configured such that calls or phones identified as being prepaid calls or phones are routed through the service node for connection to the dialed party by the service node when the account information has been verified (this type of in and out calling through a service node is often referred to as a trombone call or connection). The service node may look at various call information, such as the calling party to retrieve the appropriate account detail and the dialed number to determine a rate for that call. The service node may then monitor the duration of the call, tracking the account balance. If the account balance reaches a predetermined threshold amount, such as reaching a zero balance, the service node may end the call, such as by disconnecting the parties.

Another example of a prepaid calling system may be deployed in an intelligent network (IN) system. Such a system configuration is similar to the service node discussed above, but does not utilize trombone connections to a service node. Instead, in an IN prepaid system the network switches control the call and are able to disconnect a call if an account balance reaches a predetermined threshold amount, such as when a zero balance is reached. Typically, the IN prepaid system will operate very similar to the service node above in determining a proper account to debit, analyzing the dialed number to determine a call rate, and setting a timer or monitoring the call to disconnect the call when the account reaches a particular threshold.

Although the above examples of prepaid systems may be implemented in either traditional land-line telephone networks or wireless telephone networks, one prepaid system heretofore found only in wireless telephone networks, such as the group special mobile (GSM) environment of Europe, is a secure identification module (SIM) based prepaid system. In a SIM-based prepaid system, the subscriber account balance or purse is stored on the SIM of the wireless handset. Accordingly, the control algorithms of the SIM could stop the handset from making a call when the balance on the SIM falls below a predetermined threshold, such as when the balance reaches zero. In operation, the SIM-based system determines the cost of a call that the subscriber is then attempting to setup using signaling from the network. The signaling used is called "advice of charge" and provides information to allow algorithms in the handset to determine the cost of the call and, therefore, the time which the call may be maintained using the current purse balance. These algorithms may operate to monitor the call and disconnect the call when the balance reaches a predetermined threshold.

Another prepaid system that has heretofore been implemented only in wireless telephone networks is a handset-based prepaid system. In the handset-based prepaid system the handset has call tariff information stored therein. Accordingly, the handset may control rating of the calls based on the tariff structure which is stored within the handset. This solution does not require functionality in the network to perform prepaid call accounting. Accordingly, handset-based prepaid systems may be network independent and, therefore, may be used on multiple networks and may even be allowed to roam internationally.

For the above prepaid systems to operate effectively, they must accurately account for the services provided and maintain an accurate account balance. However, the majority of these systems operate under the assumption that the system is working correctly and, therefore, that fraud is not occurring. But fraud can occur in each of these systems by different mechanisms. In the global market, the fraudsters identify and exploit system aspects which appear to be the weakest point in such systems at that point in time. Accordingly, the fraud that occurs tends to be different year to year.

In the SIM-based prepaid system, for example, proper operation relies upon provision of accurate advice of charge information from the network to inform the SIM algorithms of the proper rate a call should be accounted for costed. Accordingly, fraudsters recognized that if they could infiltrate the loop in between the advise of charge message coming from the network and arriving at the SIM, the fraudsters could change that data or otherwise corrupt the data such that the SIM algorithms, although operating properly, would not correctly account for the cost of the call. For example, the advice of charge information may be manipulated or usurped to provide artificially low tariff rates, such that the SIM algorithms would correctly bill based on the information that it was provided, but that the information was incorrect for the actual call being made.

The handset-based prepaid system is not reliant on any signaling or information provided from the network and, accordingly, fraud on such systems may be accomplished using techniques different than that described above. Handset-based prepaid systems typically have tariff information tables and/or an account balance stored in encrypted memory to prevent fraud by preventing unauthorized persons from deciphering and manipulating the data. Using such encrypted data, a fraudster would not be able to know which bit of memory contained what data and, therefore, would not know what bits need to changed to achieve a desired result. However, fraudsters discovered that, on certain hardware architectures, they could read the information being written from the microprocessor in the handset to the encrypted memory. For example, some handset embodiments write this data in a serial fashion which is relatively easy to monitor. Accordingly, the fraudsters could make an exact copy or snapshot in time of the contents of the encrypted data file and replay this data to reset the handset to its status at a previous point in time (e.g., at a point before an account balance was depleted). For example, a fraudster might refill or top up the handset account balance once and, as the memory was being written to reflect the refilled amount (e.g., twenty dollars), a copy of that encrypted data may be made through use of special hardware coupled to the phone. Accordingly, at times thereafter, such as when the handset is turned off and then back on, the encrypted memory may be reset with this snapshot of the refilled or topped up handset status. In operation, the handset will operate to correctly tariff calls that it makes. However, the account balance will never be fully depleted because of the fraudster's ability to reset the status of the phone.

Service node prepaid systems generally operate under the assumption that fraud is avoided because the system monitors the call. For example, based on the signaling information that the service node receives, such as the originating line identity to specify the account calling and the number being dialed (the B party number), a service node prepaid system will use its tariff tables to rate the call and will monitor the duration of the call to determine a charge for the call. However, such systems can be subject to fraud if, for example, a fraudster devises a mechanism or a configuration in the network such that if a certain code is dialed, the call will not be routed through the service node. In such a situation the service node is never made aware of the call and, therefore, is not provided the opportunity to control the call. Accordingly, although the service node or the prepaid system itself may not be aware that any calls are being made, and therefore provides no indication of fraud, calls which are not being accounted for are actually being made.

Additionally, it is also possible in a service node prepaid system for a fraudster to modify an account balance on the service node by fraudulent means, such as through unauthorized access to the accounts by computer "hacking" techniques. Therefore, although the service node prepaid system may be operating properly and accurately monitoring a call, the costs of the call may not in fact be properly paid for.

The IN prepaid system may experience fraud from techniques similar to those discussed above with respect to the service node prepaid system. For example, in the IN prepaid system triggers and flags are generally used to make sure that the IN prepaid system is informed about a call's status and allowing the system to control the call as a prepaid call. A fraudster may change settings in the network such that the IN prepaid system was not aware of the call and, although the prepaid system appears to be functioning properly, no fraud is evident. Additionally, a fraudster in an IN prepaid system might gain unauthorized access to, i.e., hack, the balances associated with accounts in order to cause particular accounts to reflect larger balances than have actually been paid for, therefore allowing fraud to occur.

Therefore, there is a need in the art for systems and methods for detecting fraud in prepaid accounts.

There is a further need in the art for fraud detection to be provided independently of the prepaid system in order to detect fraud occurring on an otherwise properly operating prepaid system.

SUMMARY OF THE INVENTION

The present invention is directed to a system and method which is independent of, or makes determinations independent from, a primary prepay system and which preferably uses raw data produced by the network and/or from the prepay system to determine if fraud is occurring. For example, a system of the present invention may receive raw call data, such as the originator of the call, the destination of the call, the duration of the call, and/or the date and time of the call, and analyze that data by various means to detect, or assist in detecting, if fraud is occurring. Preferred embodiments of the present invention separately track both funds that have been authorized against a prepaid account and those that have been confirmed as entered into that prepaid account, such as in SIM-based or handset-based prepaid implementations.

Fraud may be detected through comparing the results of the analysis of the present invention to other data, such as call accounting from the associated prepaid system. For example, fraud may be detected if the value or costs of calls as monitored by the prepaid system do not substantially correspond to independent determinations made according to the present invention. Additionally or alternatively, fraud may be detected if the value of refills purchased does not substantially meet or exceed the value or costs of calls as determined according to the present invention.

Benefits of fraud detection are increased when any latency between the fraud and its detection is reduced. Accordingly, preferred embodiments of the present invention call data, such as the aforementioned call detail records and/or prepaid system refill records, is received and analyzed according to the present invention as it is generated to provide real time or near real time fraud determinations. Therefore, preferred embodiments of the present invention ensure that the latency between fraud actually occurring and being detected by the system is minimized.

A preferred embodiment of the present invention utilizes a system providing call detail record information analysis in communication with the network and in communication with the prepaid system for which fraud detection is provided. Preferably, the call detail record information analysis or other fraud detection analysis of the present invention is conducted on a separate system, such as a call data record (CDR) server of the preferred embodiment, in order to efficiently process a very large volume of fraud detection data without impacting performance of other systems, such as the associated prepaid system, as well as to provide additional confidence associated with a fully independent fraud determination. Alternatively, call detail record information analysis or other fraud detection analysis may be implemented in an available host system, such as a system of the prepaid system, such as where a large volume of calls is not expected or where impact on other system processes is not a concern.

In operation, the present invention is preferably adapted to allow a prepaid operator to independently track the balances of prepaid accounts. Accordingly, the present invention is particularly beneficial when used with systems, such as the SIM-based prepaid system and the handset-based prepaid system, wherein account information is maintained in equipment in the possession of the subscriber.

Moreover, preferred embodiments of the present invention allow a prepaid service provider, such as in a wireless system, to independently determine the total value of services, such as air time, used by their subscribers. Accordingly, a prepaid service provider may determine what infrastructure providers, such as a cellular network operator, should be invoicing the prepaid service provider for use of the system by subscribers.

The present invention may be further utilized to provide additional services to subscribers. For example, the independent account analysis provided by the present invention may be utilized to provide refunds to subscribers, such as at termination of service or if a handset containing an account balance fails and the contents of the purse are lost.

Preferred embodiments of the present invention operate to take action to prevent further fraud from occurring when fraud is detected. For example, where prepaid account information as determined according to the present invention varies from that of an associated prepaid system by a predetermined threshold amount, the present invention may operate to instruct the prepaid system and/or the network to no longer accept calls associated with that account. Preferably the aforementioned predetermined threshold amount is utilized to accommodate slight variations in the determined results resulting from using raw data provided from different sources and/or to accommodate slight variations in the determined results from utilizing different techniques to achieve the results compared. This threshold value may be enlarged or reduced (even zeroed) or negatived depending upon the particular environments in which the invention is deployed, the actual data used, the particular prepaid system for which fraud detection is provided, and/or the level of fraud detection/prevention desired. Moreover, the threshold value may be adjusted based upon the particular subscriber, type or category of subscriber, type or category of subscriber equipment, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
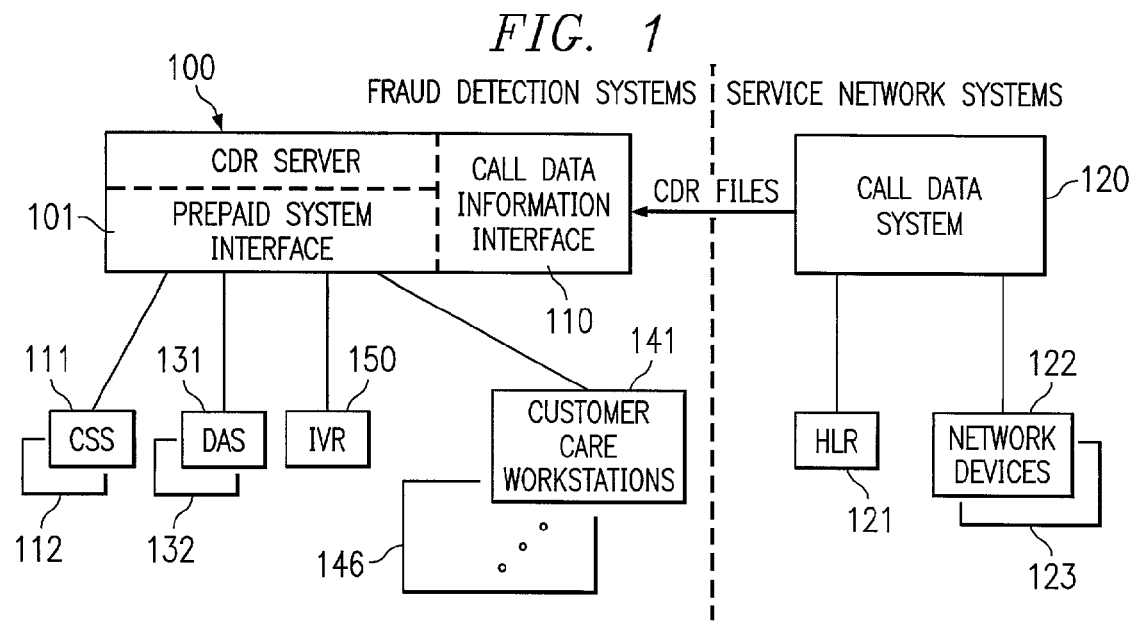
FIG. 1 shows a high level block diagram of a service network adapted to include a preferred embodiment fraud detection system of the present intention.

Directing attention to FIG. 1, a high level block diagram of a system adapted to provide fraud detection according to a preferred embodiment of the present invention is shown. The embodiment of the invention illustrated in FIG. 1 includes preferred embodiment call data record (CDR) server 100. Preferably CDR server 100 includes an interface adapted to accept information with respect to calls of interest from an external source having such information available thereto.

For example, call data information interface 110 of CDR server 100 may be adapted to interface with one or a plurality of service network systems, such as switches, central office systems, mobile switching center systems, network billing systems, and/or the like. Such service network systems are illustrated as call data system 120, which might be a network billing system for example, having home location registers (HLR) database 121 coupled thereto to provide raw call data. Also illustrated in FIG. 1 are network devices 122 and 123, such as may be call switching systems, coupled to call data system 120 to provide raw call data thereto.

Call data system 120 may operate to provide processing of raw call data received from the service network before passing the call data to CDR server 100. For example, where call data system 120 is a network billing system, call data system 120 may provide processing of raw call data in order to determine billing information usable by the service network. This processed data may be utilized by CDR server 100 provided such processed data still includes that information useful for fraud determinations according to the present invention, as will be discussed in further detail below.

Processing of raw call data by call data system 120 is not required according to the present invention. Preferred embodiments of the present invention utilize call data in the form it is generated by the service network systems in order to avoid latencies associated with its processing by other systems and/or to provide accurate information which is uncolored by any data processing. However, because many service network systems, such as public switched telephone networks and/or cellular telephone networks, include network billing systems, embodiments of the present invention may utilize information from such systems as a reliable call data information source providing data in a predictable format and having consistent content.

Figure 2:
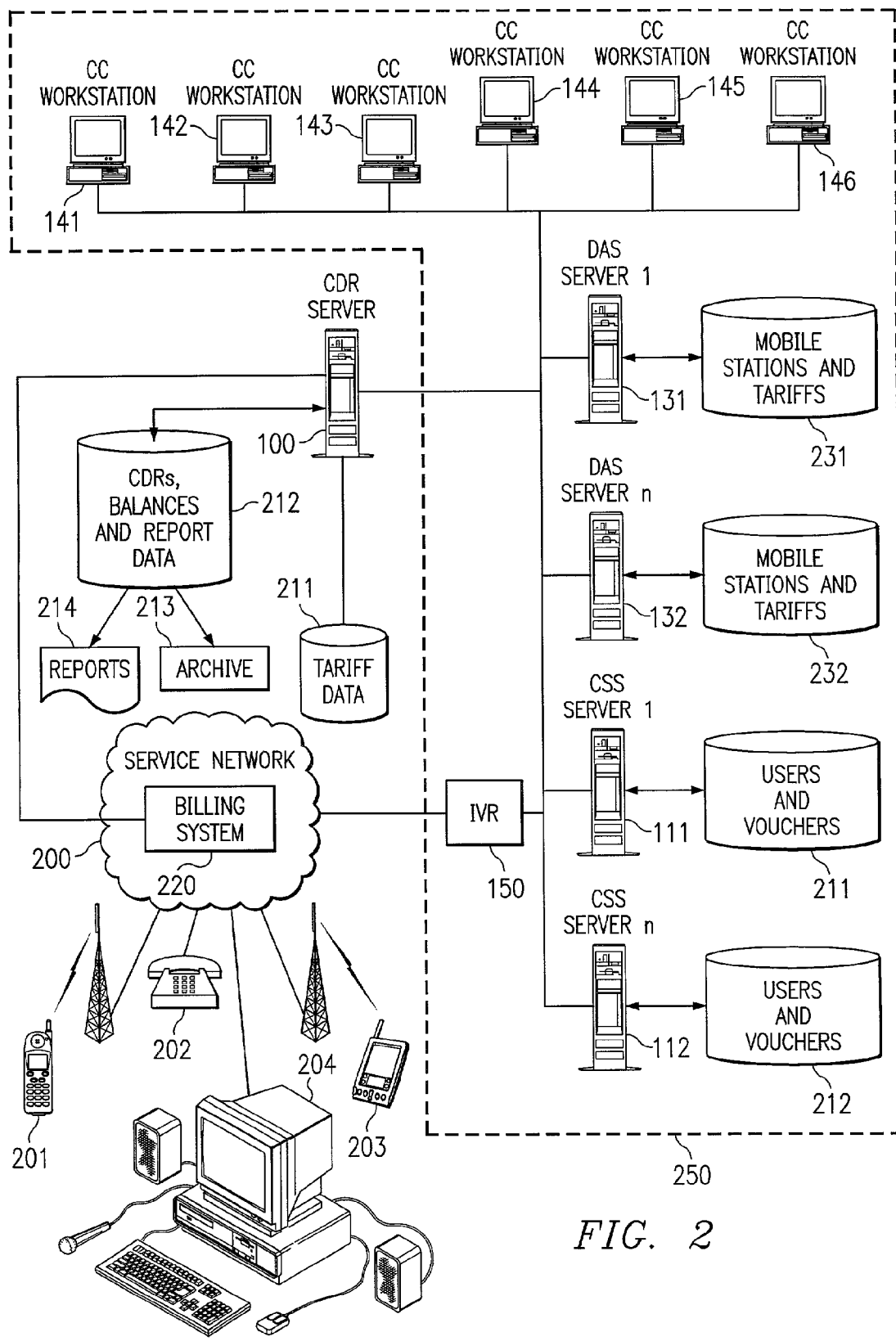
FIG. 2 shows further detail with respect to the system of FIG. 1.

As shown in FIG. 1, preferred embodiment CDR server 100 may have various systems and/or subcomponents coupled thereto, such as through prepaid system interface 101 and/or other interfaces (not shown). Referring now to FIG. 2, further detail with respect to systems and subcomponents coupled to CDR server 100 may be seen. For example, CDR server 100 preferably includes a database of call rate or tariff information, such as may be stored in database 211, associated therewith. Preferably, database 211 includes detailed call rate data, such as a rate matrix identifying various rates and their applicability, times particular rates are effective, particular calls, subscribers, and/or subscriber equipment associated with particular rates.

Additionally, CDR server 100 preferably includes a database of information derived from call detail record information received from the service network systems according to the present invention, such as subscriber balances and/or report data, as may be stored in database 212. This information may be utilized in providing various reports 214, such as reports indicating those accounts for which fraud is suspected, usage statistics, network utilization statistics, and the like.

CDR server 100 may additionally or alternatively store the information, or some portion thereof, used in deriving information according to the present invention. For example, database 212 may store call detail record information received from the service network systems utilized in determining subscriber balances and/or other report data. CDR server 100 may also be adapted to archive information, whether rate information, call detail record information, information derived from the call detail record information, or like information, such as through use of archive system 213.

Various systems and subsystems in addition to those discussed above are also shown coupled to the preferred embodiment CDR server illustrated in FIG. 2. These systems and subsystems may be a part of a prepaid calling system, such as prepaid calling system 250. For example, prepaid calling system 250 may include debit authorization servers (DAS), such as DAS 131–132 having databases 231–232 associated therewith, useful in authorizing subscriber's calls before, during, or after such calls are placed by a particular subscriber. A preferred embodiment DAS also provides for secured communication of information, such as the secure creation of encrypted information (e.g., tariffs, credit updates, etc.) which can be sent over the network to subscriber units. Prepaid calling system 250 may further include customer support systems (CSS), such as CSS 111–112 having databases 211–212 associated therewith, useful in maintaining subscriber information, such as identification of subscribers, identification of subscriber equipment, information with respect to subscriber's accounts, and/or the like.

Additionally, prepaid calling system 250 may include various systems or subsystems useful for the input and output of information. For example, prepaid calling system 250 may include one or more agent terminals, such as customer care workstations 141–146, useful in providing human interaction with subscribers and/or their associated data on prepaid calling system 250. Additionally or alternatively, prepaid calling system 250 may include a service network system interface, such as interactive voice response (IVR) system 150, useful in providing communication between prepaid calling system 250 and subscribers using a service network coupled thereto and/or the various systems of the service network coupled thereto.

For example, service network 200, such as may include a cellular communication network, the public switched telephone network (PSTN), the Internet, or other communication networks and/or combinations thereof, may be coupled to prepaid calling system 250 through IVR system 150. Accordingly, one or more subscribers, such as may utilize subscriber units such as wireless or cellular phone 201, telephone 202, wireless personal digital assistant (PDA) 203, and multimedia computer 204, may be provided access to systems or information of prepaid calling system 250. Similarly, information may be communicated between prepaid calling system 250 and systems of service network 200, such as billing system 220. Of course, interfaces, such as data network interfaces (not shown), may be utilized in providing communication between prepaid calling system 250 and service network 200, or the systems external thereto, if desired.

Preferably, CDR server 100 is in information communication with prepaid calling system 250 to thereby facilitate CDR server 100's ability to detect fraud and/or analyze other subscriber information according to the present invention. For example, IVR system 150, or other subsystem of prepaid calling system 250 such as CSS servers 111–112 or DAS servers 131–132, may provide subscriber account information to CDR server 100 for use in fraud detection. Most preferably, DAS servers 131–132 provide CDR server 100 with information with respect to subscriber account refill or "top up." Accordingly, CDR server 100 may to determine the value of a particular subscriber's calls, preferably using the aforementioned raw call detail record information provided by service network 200 and call rate or tariff information stored in database 211, and compare a total of this independently determined subscriber call value data with the subscriber's refill or top up history to determine if sufficient funds have actually been provided to support the actual calls being made. Accordingly, it should be appreciated that the present invention may be utilized to detect fraud with respect to any of the prepaid systems described above as well as other system configurations not specifically described herein.

Figure 3:
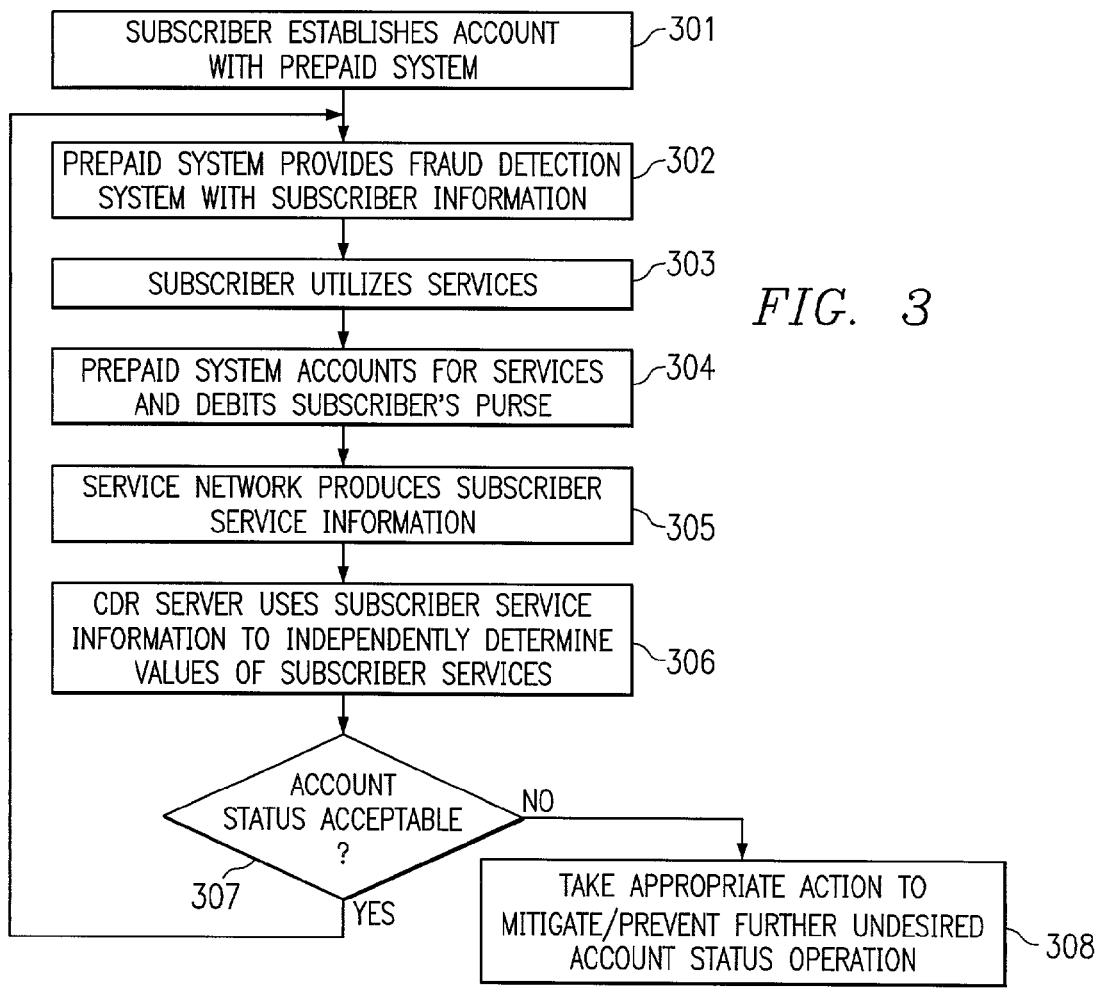
FIG. 3 shows a flow diagram of operation according to a preferred embodiment of the present invention.

Operation according to a preferred embodiment of the present invention is illustrated in the flow diagram of FIG. 3. In the illustrated embodiment, a cell phone service subscriber, such as a subscriber utilizing cellular phone 201, may establish a prepaid account with a service provider associated with prepaid calling system 250 (step 301) by dialing a particular phone number associated with IVR system 150 to thereby connect with prepaid calling system 250 through service network 200. IVR system 150 may initiate a dialogue with the subscriber to solicit subscriber information, such as subscriber identification, subscriber unit identification, payment information, and the like. Accordingly, through interaction of the subscriber with IVR system 150 a prepaid account may be activated with an initial deposit of funds stored in prepaid calling system 250. For example, $50.00 may be charged to the subscriber's credit card account and credited to a prepaid calling system purse associated with the subscriber in database 211 of CSS server 111.

Preferably, prepaid calling system 250 communicates subscriber information to a fraud detection system of the present invention (step 302). For example, IVR system 150, CSS server 111 or 112, DAS server 131 or 132, or other system of prepaid calling system 250, may communicate with CDR server 100 to provide information that this particular subscriber has credited $50.00 to an associated prepaid account, which information may be stored in database 212 associated with CDR server 100. Accordingly, CDR server 100 receives information with respect to replenishments that have occurred. The information provided to CDR server 100 may include additional information useful in detecting fraud or otherwise analyzing operation of the prepaid calling system, such as the current total credit balance associated with the subscriber stored by prepaid calling system 250, if desired.

In the above example, because the subscriber is a newly established account, prepaid calling system 250 may provide ancillary information in this initial communication sufficient for CDR server 100 to properly establish fraud detection with respect to the subscriber's account according to the present invention. For example, subscriber unit information, such as the phone number, electronic serial number, mobile identification number, and/or like information, may be provided to facilitate CDR server 100's ability to associate raw call detail record information provided by service network 100 associated with the subscriber's calls with the proper prepaid account information.

Ancillary information, perhaps a subset of that used in initializing a subscriber's account, may also be utilized in subsequent communications to facilitate operation according to the present invention. For example, prepaid calling system 250 may provide unique subscriber account information to aid CDR server 100 and prepaid calling system 250's interaction with respect to this particular subscriber. Accordingly, subsequent information communicated there between may include this unique information in order to easily allow any accompanying information, such as refill amounts, prepaid purse balances, call rate update information, and the like, to be associated with the correct subscriber records.

Because the subscriber in this example is a newly established subscriber, the information with respect to this subscriber is expected to remain substantially unaltered as stored by CDR server 100. However, it may be desirable in particular situations for CDR server 100 to manipulate the data. For example, where information is provided for an established subscriber, CDR server 100 may manipulate this data prior to, or after, storage. For example, CDR server 100 may sum a remaining prepaid balance associated with the subscriber with the amount of the refill prepaid amount provided by the prepaid calling service. This approach is preferred in order to allow CDR server 100 to maintain an independent accounting of subscriber balances and, thereby, detect fraud where the subscriber's total balance stored by prepaid server 250 is altered without a proper refill transaction having been performed.

Once the subscriber has established an account with prepaid system 250, the subscriber may utilize the prepaid services (step 303), i.e., in this example the subscriber may make calls utilizing service network 200. As the subscriber makes calls according to this exemplary embodiment, service network 200 will create call detail records for each and every call that is made in the network.

It should be appreciated that, although the same service network is discussed with respect to a subscriber contacting prepaid call system 250 for account management functions and with respect to actually providing the subscriber services, there is no such limitation according to the present invention. For example, a subscriber might perform management functions, such as the aforementioned account initialization and/or refill operations through a first network, such as the Internet, while subscriber services, such as prepaid calls, are provided through a second network, such as the PSTN.

Prepaid system 250 accounts for the services provided to the subscriber and debits the subscriber's prepaid account balance accordingly (step 304). For example, prepaid calling system 250 may be a service node system, as described above, where calls or phones identified as being prepaid calls or phones are routed through the prepaid calling system for connection to the dialed party by the service node when the account information has been verified and thereafter credit balance debiting may be performed. Alternatively, prepaid system 250 may employ another topology, such as the above described IN system, handset-based prepaid configuration, etcetera.

Systems of the service network create call information, such as call detail records, reflecting the subscribers use of the service network (step 305). This subscriber call information preferably includes such information as the start time of the call, the end time of the call, A party (or calling party) information, and B party (or called party) information. Additionally, the subscriber call information may include further detail with respect to the subscriber's use of the service network, such as identification of particular resources used, enhanced services provided, quality of service provided indicators, and the like. For example, different network elements of service network 200 may provide information with respect to a particular call having been made by a particular phone to a particular number and lasted this duration. This information may be collected centrally within service network 200, such as at billing system 220 or at a service control point (not shown).

CDR server 100 acquires subscriber call information and independently determines the value of services provided to the subscriber (step 306). For example, raw subscriber call information is preferably passed from systems of service network 200 to CDR server 100. In operation, CDR server 100 preferably utilizes the subscriber call information to independently determine the value of services provided, such as by utilizing rate information stored in database 211, and/or to make relevant adjustments to the account balance corresponding to that subscriber that is stored within the CDR server, such as in database 212.

According to one embodiment of the present invention, subscriber call information may be provided by the various systems of service network 200, such as the switches utilized in establishing a subscriber's call, HLR 121, and/or other network systems, to a centralized data collection point, such as billing system 220 used in billing service providers and/or subscribers for the services provided. This information may be processed from its most raw form, such as to determine call durations from call start and end times and/or to calculate the cost of the call. The information gathered by such a centralized data collection point is preferably provided to CDR server 100 continuously, such as throughout a call as the data elements are generated, or periodically, such as at the completion of each call, at the end of each hour or day, or at the end of a standard billing cycle. Preferred embodiments acquire the information as quickly as possible after the completion of a call to avoid or minimize latency in making fraud determinations according to the present invention.

Although the subscriber call data may be processed to some extent by such a centralized data collection point, the data provided to CDR server 100 preferably includes substantially raw data for use in independent service value determinations by CDR server 100. For example, a typical report data stream provided by billing system 220 may include the calculated cost of the call accompanied by the raw data, or some portion thereof, used in determining this cost.

It should be appreciated that the volume of data may be quite substantial. For example, in a cellular prepaid system a typical mobile phone may make two to three calls a day. In a system providing service to a large number of subscribers, such as on the order of four or five million subscribers, there is a large amount of data associated with the subscriber activity. A reasonable time to store such data may be the lifetime of a given handset proposition, i.e., the business rule that says how often the phone needs to be refilled in order not to be determined to be inactive on the system. Some such handset propositions are one year, thereby suggesting that data utilized according to the present invention should be stored one year. If the present invention were to store all data associated with a particular subscriber's call, and were to store it a reasonable amount of time, it is easy to see that a very large amount of data storage and handling capacity would be required.

Accordingly, preferred embodiments of the present invention perform "data culling" such that received subscriber call information, such as in a predetermined format, not helpful in operation according to the present invention, such as calculated costs of the call, is ignored or discarded and some portion of the most raw data, i.e., the data having been processed or altered the least after its generation by a data source, such as the originator of the call, the destination of the call, the duration of the call, and the date and time that the call is made, is used and/or stored in operation according to the present invention. Accordingly, preferred embodiment CDR server 100 system capacity may be optimized. In addition to the above discussed system capacity advantages associated with the preferred embodiment data culling, the most raw data available is preferably utilized by CDR server 100 in its determinations to thereby avoid any error or fraud associated with data processing by systems external thereto. However, alternative embodiments of CDR server 100 of the present invention may utilize any level of processed data consistent with the level of confidence desired with respect to independent determinations made.

Centralized data collection point systems, such as billing system 220, often process information on a batch basis and provide it on a periodic basis, e.g., once a day, and therefore may result in increased latency in fraud detection associated with their use. Moreover, such systems may present other issues with respect to particular implementations of the present invention. For example, service network billing systems utilized in a handset-based prepaid system are typically not aware of the exact date and time that a tariff changes on a handset and, therefore, the service value calculation that such systems makes is at best an approximation of the prepaid value of the service. Accordingly, the processing of subscriber call information by such systems is often of little or no value to the operation of the present invention.

However, it should be appreciated that the use of a centralized data collection point, such as the aforementioned service network billing system, may be desired according to particular embodiments of the present invention. For example, service networks might already have a service network billing system deployed therein to calculate the cost of calls, such as to determine the revenue that should be paid to or collected from service providers by the network operator. Similarly, prepaid system infrastructure may include such billing systems to provide a very broad brush network view of services used by their subscriber base, such as the what types of numbers are being dialed (e.g., are the subscribers primarily dialing international numbers, long distance numbers, or local numbers), how many minutes of usage are the subscribers averaging and at what times of day, etcetera. Accordingly, a service network billing system may provide a readily available source for acquiring subscriber call information for use according to the present invention.

However, it should be appreciated that the present invention does not require such a billing system and, therefore, embodiments of the present invention collect information from the service network without employing such a billing system. For example, preferred embodiments of the present invention are provided subscriber call information from service network systems such as a HLR database or mobile switching center (MSC) of the service network. Such embodiments may be preferred because, if CDR server 100 is able to acquire the raw data prior to the billing system rather than after the billing system, such an implementation is expected to result in the latency of acquiring the data being reduced. The more quickly CDR server 100 can acquire the call data, the more quickly fraud determinations may be made and, therefore, fraud can be stopped or prevented.

Having independently determined the value of services from subscriber call information available from the service network, the present invention preferably operates to make determinations, e.g., fraud determinations, with respect to the relevant subscriber's account (step 307). For example, on an account-by-account basis, the CDR server of the preferred embodiment will have information with respect to all refill or credit operations for a subscriber account and may take the time and date that such refills or credits have occurred with the subscriber call information to determine how much money has gone into that account. At a most basic level, a comparison of money that has gone into an account and the money that has been spent by that account may be made and if the money spent by the account is the larger amount a determination of fraud may be made.

Preferably, fraud detection determinations are made by CDR server by comparing an adjusted account balance (the adjusted account balance being determined from account refill/credit information provided to the CDR server, as described above, having the value of services provided determined by CDR server 100, as described above, dedicated therefrom) to a given threshold. A threshold comparison is utilized according to a preferred embodiment to accommodate some hysteresis in the system, e.g., it is possible that the duration of call indicated by the network is slightly different by one or two seconds or more compared to what the prepaid system that has costed that call believes is the case. However, the basic premises of the preferred embodiment is that an account should not be enabled to spend more than a given threshold more or less than what has gone into that account. For example, a given level of negativity may be allowed before a determination of fraud is made to allow for differences in the techniques and/or accuracy of service value calculations between CDR server 100 and prepaid calling system 250. Accordingly, the aforementioned threshold may be a negative value, such as −$10.00. Alternatively, the threshold value may be a positive value, such as $5.00, to ensure that services provided are always prepaid.

It should be appreciated that the above threshold value may be selected based upon a desired system operation and, therefore, may be a variable which is set by a system operator. Moreover, different threshold values may be utilized in a single system, such as to provide different threshold values for particular subscribers, particular categories of subscribers, particular categories of subscriber equipment, particular categories of services, and the like. For example, particular types of subscriber equipment that have historically experienced disproportionate amounts of fraud may have a higher threshold level associated therewith. Similarly, subscriber accounts using subscriber services which have historically experienced disproportionate amounts of fraud may have a higher threshold level associated therewith.

Additionally or alternatively fraud detection determinations may be made through comparison of independently determined service values and/or subscriber account balances. For example, information provided to CDR server 100 by prepaid calling system 250 may include information such as the current total credit balance associated with the subscriber stored by prepaid calling system 250, if desired. Accordingly, CDR server 100 may compare its independently determined current balance, determined from deducting values of calls as indicated by call detail records provided by network 200 from the subscriber's refill balance total indicated by refill information provided at each refill operation by prepaid calling system 250, to the current prepaid balance stored by prepaid calling system 250. Irrespective of comparison to a threshold amount to determine instances of fraud as discussed above, if a sufficient discrepancy or variance between an adjusted account balance of CDR server 100 and an account balance as available to prepaid calling system 250 is determined to exist, a determination that fraud is occurring may be made. Here, as with the above described fraud determination, a threshold value, which may be varied from system to system, subscriber to subscriber, etcetera, is preferably utilized to accommodate differences in the techniques and/or accuracy of service value calculations between CDR server 100 and prepaid calling system 250.

As discussed above, the preferred embodiment CDR server will determine what it believes the account balance should be for each and every account for which it receives call detail records. If the CDR server does not receive call detail records with respect to a particular account then it may assume that the account is not being used. However, if an account has never been activated for a particular subscriber or subscriber unit for which calling services are provided within the network, call data would be produced by the network elements for such calls and provided to the CDR server of the present invention. Preferably, the CDR server would very quickly show a negative value for this account which had no refill history and, accordingly, would detect fraud and react accordingly.

If the account status is found to be acceptable at step 307, the preferred embodiment operates to allow the subscriber to acquire further services (e.g., returning to step 302 to allow updating of subscriber account information associated with refill operations and utilization of services). However, if undesired account status is detected at step 307, the preferred embodiment operates to take appropriate action to mitigate/prevent further undesired account status operation (step 308). Such action may include generation and transmission of a report or alarm to a system operator in order that a decision may be made with respect to taking action to bar the particular subscriber from acquiring further services until the appropriate account status is rectified. Alternatively, the present invention may operate to automatically bar the offending subscriber by communicating to the appropriate service network systems, such as communicating through the service network's provisioning system to HLR 121 and setting the proper registers to actually bar the subscriber.

It should be appreciated that a combination of actions may be taken with respect to particular subscriber's account status. For example, a first threshold value may be established which when data comparisons, as discussed above, indicate the threshold has been crossed a report or alarm to the system operator may be implemented to instigate further analysis or further monitoring of a particular account. However, a second threshold value may be established which when data comparisons indicate the threshold has been crossed the subscriber is automatically barred from further service acquisition. Accordingly, a hierarchy of remedial action may be implemented according to the present invention.

Preferably, as discussed above, a CDR server operating according to the present invention determines and/or maintains an adjusted account balance or a shadow prepaid balance. However, because of the nature of the service network, such as typical telephone systems that include grounding errors, differences in timing, etcetera, the subscriber's purse as stored by prepaid system 250 and the adjusted account balance as determined by CDR server 100 may naturally differ slightly and such differences may continue to grow as these errors and differences aggregate. Accordingly, preferred embodiments of the present invention include a mechanism for synchronizing the accounts over time, such as using a set of synchronization rules, so that the system can operate in perpetuity without a slowly increasing inaccuracy causing a malfunction or failure.

For example, the CDR server adjusted account balance may be periodically set to that of the prepaid calling service after a comparison to verify that the two balances are within a predetermined threshold amount. This threshold amount may be established based upon an amount at which it may be assumed that no fraud has occurred or that only negligible fraud might have been experienced, and may be the same as one or more of the threshold values described above.

Additionally or alternatively, synchronization may be accomplished based upon criteria other than the correspondence of the adjusted account balance of the CDR server and the account balance of the prepaid calling system. For example, after a determination that no, or negligible, fraud is present based upon the adjusted account balance not being within a particular threshold value as described above, the account balances may be synchronized.

It should be appreciated that operation of preferred embodiments of the present invention provides flexibility to accommodate changing of tariffs on a per subscriber basis. For example, when a tariff is to be implemented for a particular subscriber or for a class of subscribers, tariff change information, e.g., rate update information, may be provided to the CDR server of the present invention, possibly with information as to when the change is to be implemented. Accordingly, the CDR server is able to implement the new rates for each subscriber as the rates take effect. In a preferred embodiment, tariff information is provided to the CDR server accompanying the transmission of refill/credit information for that subscriber account. This technique is clearly effective with systems which implement rate changes with a refill operation. However, this technique is also effective with systems which implement rate changes at a particular time or day because the rate update data can include an effective time or day and the raw call data provided to the CDR server is expected to include corresponding time information.

The rate data utilized by the CDR server of the preferred embodiment is not limited to information typically thought of as call rating data. For example, the rate data may include a list of special billed numbers, such as designated numbers for which the subscriber receives free or reduced rate calling. Accordingly, the present invention provides flexibility to accommodate specific exception numbers or special billed numbers with respect to a particular handset.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for detecting fraud in a prepaid system, said fraud detecting system comprising:
   an interface to said prepaid system, wherein said prepaid system accounts for subscriber account credits and subscriber account debits to thereby determine a subscriber prepaid balance for use in operating said prepaid system, wherein said prepaid system interface accepts prepaid account credit information from said prepaid system;
   an interface to a service system, wherein said service system interface accepts information with respect to services provided; and control logic utilizing said prepaid account credit information accepted through said prepaid system interface and said information with respect to services provided accepted through said service system interface to thereby determine a fraud detection subscriber account balance, wherein said control logic utilizes said fraud detection subscriber account balance to determine a fraud condition in an associated subscriber account independent of said determination of said subscriber prepaid balance by said prepaid system.

2. The system of claim 1, wherein said prepaid system comprises a prepaid calling system.

3. The system of claim 2, wherein subscriber units utilizing said prepaid calling system store a secure prepaid credit value on a subscriber unit.

4. The system of claim 2, wherein said prepaid calling system stores secure prepaid credit values for a plurality of subscribers in a centralized memory.

5. The system of claim 1, wherein said prepaid account credit information accepted by said prepaid system interface is information with respect to refill of a corresponding subscriber account.

6. The system of claim 5, wherein said refill information includes a refill amount and time information with respect to said refill amount.

7. The system of claim 1, wherein said service system comprises a wireless communication system.

8. The system of claim 1, wherein said information with respect to services provided includes substantially unprocessed service data associated with a particular subscriber service transaction.

9. The system of claim 8, further comprising:
service rating information stored in communication with said control logic, wherein said substantially unprocessed service data includes information provided by components of said service network sufficient for allowing a determination of service value using said service rating information.

10. The system of claim 9, wherein said service rating information is provided to said fraud detecting system by said prepaid system.

11. The system of claim 9, wherein said service rating information includes information with respect to a time at which particular rating information is to be effective.

12. The system of claim 9, wherein said substantially unprocessed service data includes information with respect to a calling party, information with respect to a called party, and information with respect to a length of a call.

13. The system of claim 12, wherein said information with respect to a length of a call includes information with respect to a time of said call.

14. The system of claim 12, wherein said substantially unprocessed service data is accompanied by substantially processed data, wherein said substantially processed data is culled by said fraud detecting system.

15. The system of claim 14, wherein said substantially processed data includes a determination of service value by a system external to said fraud detecting system.

16. The system of claim 15, wherein said system external to said fraud detecting system is a billing system of said service system.

17. The system of claim 1, wherein said fraud condition determination is made at least in part through comparison of said fraud detection subscriber account balance to a predetermined threshold value.

18. The system of claim 17, wherein said threshold value is selected to accommodate an acceptable amount of difference in a subscriber account balance as determined by said prepaid system and said fraud detecting system.

19. The system of claim 18, wherein said threshold value is a negative value.

20. The system of claim 1, wherein said fraud condition determination includes a hierarchy of fraud determinations.

21. The system of claim 20, wherein said hierarchy of fraud determinations includes a first fraud condition determination having a first response associated therewith and a second fraud condition determination having a second response associated therewith.

22. The system of claim 21, wherein said first fraud condition determination is made at least in part through comparison of said fraud detection subscriber account balance to a first predetermined threshold value, and wherein said second fraud condition determination is made at least in part through comparison of said fraud detection subscriber account balance to a second predetermined threshold value, wherein said first predetermined threshold value is greater than said second predetermined threshold value.

23. The system of claim 21, wherein said first fraud condition is associated with a suspicion of fraud and said second fraud condition is associated with a conclusion of fraud.

24. The system of claim 21, wherein said first response includes a notification transmitted to said prepaid system by said fraud detecting system, and wherein said second response includes information with respect to subscriber activity suspension transmitted to said service system.

25. The system of claim 1, wherein, when said determination of said fraud condition by said control logic indicates an unacceptable level of fraud, information with respect to subscriber activity suspension is transmitted to said service system to thereby prevent further use of said service system by an associated subscriber.

26. The system of claim 1, wherein said control logic further utilizes said information with respect to services provided accepted through said service system interface to determine charges with respect to said service system associated with use of said prepaid system.

27. A method for detecting fraudulent use of a service network associated with a prepaid system, said method comprising:
interfacing a fraud detection system to said prepaid system, wherein said prepaid system accounts for subscriber account credits and subscriber account debits to thereby determine a subscriber prepaid balance for use of said service network;
interfacing said fraud detection system to said service network, wherein said service network provides communication of subscriber information and generates transaction information associated with communication of said subscriber information;
accepting prepaid account credit information from said prepaid system at said fraud detection system;
accepting transaction information from said service network at said fraud detection system;
determining a service value using said accepted transaction information; and
determining a fraud condition in an associated subscriber account as a function of said accepted prepaid account credit information and said service value determined.

28. The method of claim 27, wherein said accepted prepaid account information comprises information with respect to subscriber account value refill by an associated subscriber.

29. The method of claim 28, wherein said accepted prepaid account information further comprises information with respect to a time of said subscriber account value refill.

30. The method of claim 28, wherein said accepted prepaid account information further comprises service rating information.

31. The method of claim 27, wherein said prepaid system is a prepaid calling system, and wherein said method further comprises:
said prepaid calling system interacting with subscribers to determine a subscriber account credit.

32. The method of claim 31, wherein said prepaid account credit information accepting step is performed in close temporal proximity to said interaction between said subscriber and said prepaid calling system.

33. The method of claim 32, wherein said close temporal proximity is substantially immediately after completion of said interaction between said subscriber and said prepaid calling system.

34. The method of claim 27, wherein said service network comprises a voice communication network, and wherein said method further comprises:
at least one network element of said service network generating data of said transaction information.

35. The method of claim 34, wherein said voice communication network comprises a cellular wireless communication network.

36. The method of claim 34, wherein said at least one network element is a network element of said service network utilized in providing communication of subscriber information in a transaction associated with said transaction information.

37. The method of claim 36, wherein said at least one network element is a network switch.

38. The method of claim 36, wherein said at least one network element is a mobile switching center.

39. The method of claim 34, wherein said transaction information accepting step is performed in close temporal proximity to said data generation.

40. The method of claim 39, wherein said close temporal proximity is substantially immediately after completion of said transaction.

41. The method of claim 34, wherein said transaction information includes information with respect to a calling party, information with respect to a called party, and information with respect to a length of a call.

42. The method of claim 34, wherein said generated data is substantially unprocessed when accepted at said fraud detection system.

43. The method of claim 42, wherein said substantially unprocessed generated data accepted at said fraud detection system is accompanied by substantially processed data, wherein said substantially processed data is culled by said fraud detection system.

44. The method of claim 42, wherein said substantially processed data includes a determination of service value by a system external to said fraud detection system.

45. The method of claim 44, wherein said system external to said fraud detection system is a billing system of said service network.

46. The method of claim 27, further comprising:
determining a fraud detection subscriber account balance using said service value determined by said fraud detection system.

47. The method of claim 46, further comprising:
periodically synchronizing said fraud detection subscriber account balance and said subscriber prepaid balance.

48. The method of claim 47, wherein said synchronizing is accomplished after a determination that an unacceptable fraud condition does not exist in said fraud condition determining step.

49. The method of claim 47, wherein said synchronizing is accomplished after a predetermined amount of credit value has been deducted from said subscriber prepaid balance.

50. The method of claim 47, wherein said synchronizing is accomplished after a predetermined amount of credit value has been added to said subscriber prepaid balance.

51. The method of claim 46, wherein said step of determining a fraud condition comprises:
comparing said fraud detection subscriber account balance to a predetermined threshold value.

52. The method of claim 51, further comprising:
determining said predetermined threshold value as a function of an acceptable difference between said subscriber prepaid balance as determined by said prepaid system and said fraud detection subscriber account balance as determined by said fraud detection system.

53. The method of claim 52, wherein said acceptable difference is associated with a difference in techniques to achieve said subscriber prepaid balance and said fraud detection subscriber account balance.

54. The method of claim 51, wherein said predetermined threshold value is negative.

55. The method of claim 51, further comprising:
selecting said predetermined threshold value as a function of a particular environment in which said fraud detection system is deployed.

56. The method of claim 51, further comprising:
selecting said predetermined threshold value as a function of a particular prepaid system for which fraud detection is provided.

57. The method of claim 51, further comprising:
selecting said predetermined threshold value as a function of a particular subscriber.

58. The method of claim 51, further comprising:
selecting said predetermined threshold value as a function of a particular category of subscriber.

59. The method of claim 51, further comprising:
selecting said predetermined threshold value as a function of a particular category of subscriber equipment.

60. The method of claim 27, further comprising:
selecting a first threshold value; and
selecting a second threshold value, wherein said first and second threshold values are utilized in determining a first and second fraud condition in said fraud condition determining step.

61. The method of claim 60, further comprising:
transmitting a signal for said associated subscriber account to said prepaid system when said first threshold value is exceeded; and
transmitting an account suspension signal for said associated subscriber account to said service network when said second threshold value is exceeded.

62. A method for detecting fraudulent use of a telephone network, said method comprising:
interfacing a prepaid calling system with said telephone network, wherein said prepaid calling system interacts with subscribers to provide credits to an associated subscriber prepaid account and said prepaid calling system interacts with said telephone network to debit subscriber prepaid accounts corresponding to subscriber use of said telephone network to thereby determine subscriber prepaid account balances;

selecting a fraud threshold value for use by a call data record server;

interfacing said call data record server to said prepaid calling system;

interfacing said call data record server to said telephone network;

accepting prepaid account credit information from said prepaid calling system at said call data record server, wherein said prepaid account information is accepted by said call data record server substantially at the completion of interaction between said prepaid calling system and said subscriber;

accepting subscriber call information from said telephone network at said call data record server, wherein said subscriber call information is accepted by said call data record server substantially at the completion of an associated call;

determining a value of a subscriber call using said accepted subscriber call information;

determining a call data server subscriber account balance using said determined subscriber call value and said accepted prepaid account credit information;

comparing said determined call data server subscriber account balance to said threshold value; and determining if an unacceptable level of fraud is associated with a particular subscriber prepaid account as a function of said comparison.

63. The method of claim 62, wherein said prepaid calling system stores a secure prepaid credit value on subscriber equipment.

64. The method of claim 62, wherein said threshold value is selected as a function of a particular type of subscriber equipment.

65. The method of claim 62, wherein said threshold value is selected as a function of a particular subscriber.

66. The method of claim 62, wherein said threshold value is selected as a function of a particular type of subscriber.

67. The method of claim 62, wherein said accepted prepaid account information comprises information with respect to subscriber account value refill by an associated subscriber.

68. The method of claim 67, wherein said accepted prepaid account information further comprises call rating information, wherein said call rating information is utilized by said call data server subscriber account balance determining step.

69. The method of claim 62, further comprises:

at least one network element of said telephone network generating data of said subscriber call information, wherein said at least one network element is utilized by said telephone network in providing a call associated with said generated data.

70. The method of claim 69, wherein said generated data is substantially unprocessed when accepted at said call data server.

* * * * *